US008412753B2

(12) United States Patent
Thaler et al.

(10) Patent No.: US 8,412,753 B2
(45) Date of Patent: *Apr. 2, 2013

(54) FILE CREATION API (75) Inventors: Drew Thaler, San Francisco, CA (US);
John Bertagnolli, Parker, CO (US);
Mike Shields, Salt Lake City, UT (US);
Ed Wynne, Pinckney, MI (US)

(73) Assignee: Apple Inc., Cupertino, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/796,015

(22) Filed: Jun. 8, 2010

(65) Prior Publication Data

US 2010/0312806 A1    Dec. 9, 2010

Related U.S. Application Data (63) Continuation of application No. 10/429,847, filed on May 6, 2003, now Pat. No. 7,761,488.

(51) Int. Cl.
G06F 17/30 (2006.01)

(52) U.S. Cl. ...................................................... 707/829

(58) Field of Classification Search .................. 707/829, 707/828, 821–823, 803, 790, 687, 693, 999.1–102, 707/999.2, 999.205
See application file for complete search history.

(56) References Cited

U.S. PATENT DOCUMENTS

| 5,276,874 A | 1/1994 | Thomson |
| 5,359,725 A | 10/1994 | Garcia et al. |
| 6,091,686 A | 7/2000 | Caffarelli et al. |
| 6,226,241 B1 | 5/2001 | D'Amato et al. |
| 6,353,173 B1 | 3/2002 | D'Amato et al. |
| 7,761,488 B2 * | 7/2010 | Thaler et al. .................. 707/823 |
| 2001/0047348 A1 * | 11/2001 | Davis ................................. 707/1 |
| 2002/0049746 A1 * | 4/2002 | De Roose ......................... 707/1 |

OTHER PUBLICATIONS

Langer, Maria, "Mac OS X 10.2: Visual QuickStart Guide" Sep. 17, 2002, Peachpit Press, p. 1, 90.*
Tyve, Johannes et al., "Using umask instead of explicit mode bits to create files/directories" Nov. 2000, lists.samba.org, pp. 1-3.
Duke Computer Science Dept., "Using Solaris ACLs" Mar. 2003, www.cs.duke.edu, pp. 1-3.
Adaptec, Adaptec Toast User's Guide 3.5, Oct. 1997, (http://download.iomega.com/english/zipcdu_toast.pdf) sections—pp. 3-1->3-3, 3-11, 3-12, 6-8->6-15, 6-22, 7-6>7-9, A-3, and A-4.
Pierre Igot, Toast 5 Titanium, Jul. 2001, Applelust.com (http://www.applelust.com/alust/resources/Reviews/Archives/rev_toast5.html)., pp. 1-5.

(Continued)

Primary Examiner — Amresh Singh
(74) Attorney, Agent, or Firm — Fish & Richardson P.C.

(57) ABSTRACT

An application program interface (API) provides means for dynamic filesystem creation, that allows complex filesystem hierarchies to be created and written on-the-fly without having to generate a complete on-disk representation. The filesystem is laid out in a one-parent many-children hierarchy of file and folder objects. The API recursively traverses the filesystem hierarchy beginning at the root node to determine the filesystem's structure. Callback functions for retrieval of file data are determined for each filesystem object and stored in memory. Output blocks are allocated for file data as needed. During the writing phase, the callback functions are executed to retrieve file data which is then written to the desired computer readable media.

20 Claims, 4 Drawing Sheets

OTHER PUBLICATIONS

SunOS 5.9, Man Page: setfacl(1), Dec. 2001, Sun Microsystems (http://web.cse.msu.edu/cgi-bin/man2html?setfacl?1?/usr/man)., pp. 1-5.

Adaptec, Inc., "Adaptec Toast User Manual" Apr. 3, 1997, Adaptec, Inc. p. 0-202.

Adaptec, Adaptec Toast User's Guide 3.5, Oct. 1997, (http://download.iomega.com/english/manuals/english/zipcdu_toast.pdf) sections—pp. 7-1->7-5.

* cited by examiner

FILE CREATION API

FIELD OF THE INVENTION

The invention relates to the field of computer operating systems, and more specifically, to an application program interface (API) for creating a dynamic filesystem on a computer readable media.

BACKGROUND OF THE INVENTION

With the introduction of compact disc recorders (CD-Rs), compact disc re-writeable recorders (CD-RWs), digital video disc recorders (DVD-Rs), and digital video disc re-writeable recorders (DVD-RWs) into the consumer market, more and more individuals are customizing their own CDs and/or DVDs. Whether it be a compilation of their favorite songs, picture slide shows, or hard drive backups, the creation or burning of customized CDs and to some extent DVDs is becoming more and more commonplace even with traditionally non-technical consumers.

Typical data CDs require creation of one or more (frequently at least two) complete filesystems at a time, each containing filesystem data describing the layout of folders and files, as well as actual file data. When more than one filesystem is present, the filesystems are typically intermingled as a hybrid; that is, the filesystem data for each filesystem is separated according to the rules of the filesystem, but each filesystem typically refers to the same blocks on disk for the actual file data.

Known methods for constructing a customized CD, i.e., a CD wherein the hierarchy of the filesystem(s) is defined by the creator of the CD and is not limited to simply being a copy of existing files and directories, employ a two-step process. First, an image representing the entire disc and all filesystem(s) is created on a local hard drive, and then second, the image is burned to a CD. These methods present several drawbacks, however, with regard to time and disk space as a result of creating an image of the desired filesystem(s) prior to burning them on a CD.

For example, to burn a customized filesystem containing 4.6 GB of information, using known methods, an image of the entire filesystem is created on the user's hard drive. Accordingly, the entire filesystem including its 4.6 GB of information is copied from its source location to the image space on the hard drive. Not only can this process of creating the image take up to an hour to complete, but the image uses 4.6 GB of space on the user's hard drive resulting in over 9 GB of space being used if the original information is also stored on the hard drive.

Accordingly, one skilled in the art can readily appreciate the desirability in providing a method of creating customized filesystems that does not require the inefficiency of first creating an image of the filesystem on a root disk and then copying the filesystem to the desired media.

SUMMARY OF THE INVENTION

The invention overcomes the above-identified drawbacks of known methods, by providing a method and application program interface (API) for creating customized filesystems without creating an image of the filesystem(s) prior to recording the filesystem(s) on a computer readable medium.

According to exemplary embodiments of the invention, the filesystem structure is defined using an hierarchy of filesystem objects, and then only the structure need be stored in memory as opposed to the complete filesystem (i.e., structure and actual data). Therefore, the invention overcomes the drawbacks associated with conventional methods which require that a complete image of the filesystem be created.

Then, during the pre-write stage, the filesystem structure stored in memory is recursively traversed beginning with the root object, and output blocks are allocated for each filesystem object specifying, among other things, size, placement criteria and a callback function for producing data. Then, during the write stage, actual file data is retrieved and each block is written to the specified media.

BRIEF DESCRIPTION OF THE DRAWING FIGURES

The objects and advantages of the invention will be understood by reading the detailed description in conjunction with the drawings, in which.

DETAILED DESCRIPTION OF THE INVENTION

To facilitate an understanding of the principles and features of the present invention, it is explained hereinafter with reference to its implementation in an illustrative embodiment. In particular, the invention is described in the context of creating or burning customized CDs. It will be appreciated, however, that this is not the only embodiment in which the invention can be implemented. Rather, it can find utility in a variety of applications, as will become apparent from an understanding of the principles that underscore the invention.

Throughout this specification, the phrase "customized filesystem" is utilized to reflect the creation of a filesystem or hybrid of multiple filesystems wherein the hierarchy and properties are dynamically specified. Furthermore, the phrase "folder" as used throughout the specification is synonymous with the phrase "directory."

Figure 1:
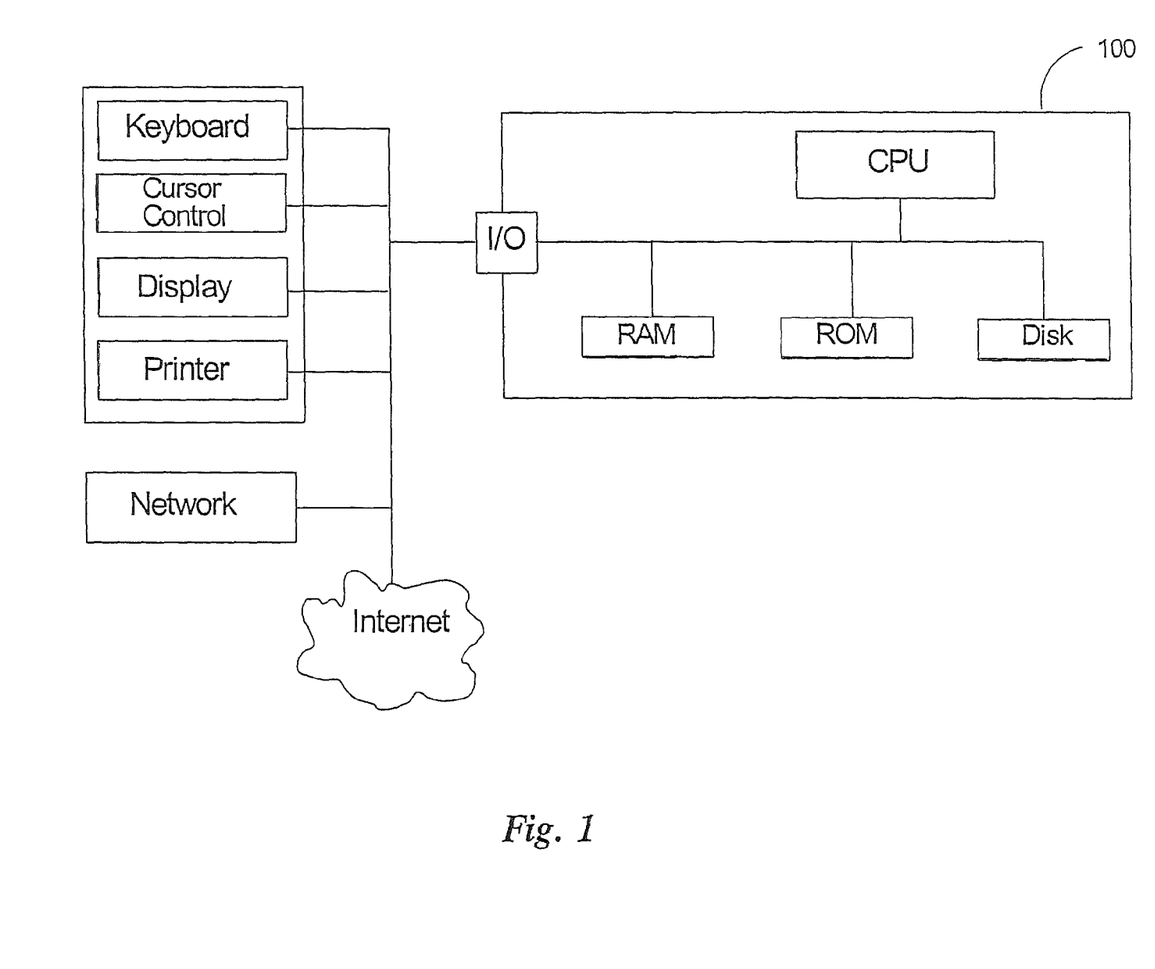
FIG. 1 shows a block diagram of an exemplary computer system in which the invention may be employed.

An exemplary computer system in which the invention can be employed is illustrated in block diagram form in FIG. 1. The structure of the computer itself is of a conventional type. As the components and interaction of computer systems of this type are well known, they are not further described here.

Computer 100 typically includes an operating system (OS), which controls the allocation and usage of the hardware resources such as memory, central processing unit time, disk space, and peripheral devices. Computer 100 is also typically configured to interact with various types of computer readable media, such as floppy disks, CDs, DVDs, CDRs, removable media cartridges, hard drives, and various types of removable memory sticks.

The operating system also controls the filesystem used to organize and keep track of files. Depending upon the filesystem standard employed, folders and files can be named in a variety of manners, in accordance with the naming convention of the particular standard, as discussed further below.

As briefly discussed above, the invention overcomes the drawbacks associated with conventional CD burning methods by providing an application program interface (API) for dynamic filesystem creation that allows complex filesystem hierarchies to be created and written on-the-fly. More particularly, the API writes the specified filesystem(s) without generating a complete on-disk representation beforehand. This is achieved by specifying the desired filesystem hierarchy through the API, which stores the minimal amount of information needed to create the filesystem(s) in the computer's memory subsystem, in contrast to storing a complete image of the desired filesystem on disk.

Figure 2:
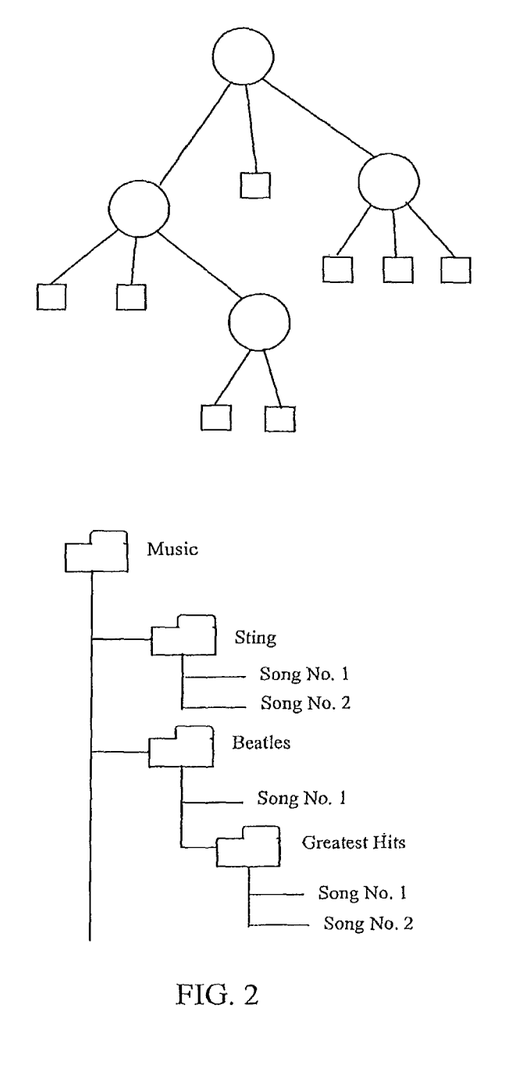
FIG. 2 shows an exemplary filesystem hierarchy that can be created by the invention.

The API is designed around folder and file objects which are laid out in a one-parent-many-children hierarchy, as shown in the filesystem diagrams of FIG. 2. Throughout the specification, the phrase "filesystem object" is utilized to reflect any folder or file object used in the API. Filesystem objects are either "real" or "virtual" objects. A filesystem hierarchy specified by the API can be as simple as a single real folder, or it can be as complex as needed, for example, a virtual folder with a deep hierarchy of children which are a mix of real files, virtual files, real folders, and virtual folders.

A real filesystem object corresponds directly to a file or folder of an existing filesystem. The data for a real file object comes directly from the existing filesystem, likewise the hierarchy underneath a real folder object corresponds 1:1 to the hierarchy underneath the folder in the existing filesystem. As a result, the descendants of a real folder object in the hierarchy cannot be directly changed through the API.

A virtual filesystem object does not necessarily have any actual representation on disk. The data for a virtual file object is specified through the API, or in a callback function. Likewise the hierarchy underneath a virtual folder object is specified through the API.

In a filesystem hierarchy specified through the API, only virtual objects can be assigned children. Real files, virtual files, and real folders are all considered leaf nodes and may not have children. Real folders may of course contain files and folders in the final output, but the files and folders are specified by the existing filesystem. Therefore, in order to change the folder hierarchy of a real folder, the real folder must first be converted to a virtual folder.

When a real folder object is converted to a virtual folder object, the resulting virtual folder is a snapshot of the on-disk/real folder at the moment of the conversion. The newly created virtual folder contains real folder and file objects corresponding to the children of the real folder. For example, if the on-disk folder root contains file1 and folder2, after conversion, the result is a virtual folder named root, with two children: the real file file1 and the real folder folder2.

Frequently, as mentioned above, more than one filesystem is intermingled in the output to create a hybrid disc that is readable by many diverse computer systems. An important part of the task of creating multiple intermingled filesystem at the same time is allowing each output filesystem to be specified uniquely and separately at any level of detail required. There are many possible reasons why this is desirable. For example, if creating a disc that conforms to an explicit specification such as Video CD, automatically generated names may not be sufficient; or to make things simpler to the end user, the creator may desire to insert a file in one filesystem but not in others.

The API allows for this in three ways. First, names may be specified individually for each filesystem object on a per filesystem basis, as well as globally for all filesystems. Second, other filesystem metadata may be specified individually for each object on a per filesystem basis, as well as globally for all filesystems. Third, individual filesystem objects may be entirely suppressed from one or all output filesystems. This functionality provides building blocks that may be used over and over again, allowing a user of the API to create an arbitrarily complex disc, wherein each intermingled filesystem in the output presents the data in vastly different ways and each filesystem bears no resemblance to the other.

In the API, each filesystem object has one "base" name from which other names are generated. This name represents the desired name for the object, and unless further specified, this name (or an approximation thereof) is used in each output filesystem. Real filesystem objects derive their base name from the source file or folder's name in the existing filesystem. Virtual filesystem objects have their base name specified upon creation. The base name can be retrieved or changed through the API.

However, the base name might not be, and frequently is not, used in the output without modification. This results from the fact that each output filesystem can have different naming requirements based upon a particular filesystem standard, for example, ISO-9660 level 1, ISO-9660 level 2, Joliet and HFS+. An object's conforming name is referred to as the object's "specific" name for each filesystem. By default, an object's specific names are automatically generated from the object's base name.

If the base name conforms to a filesystem's naming convention, the automatically-generated specific name for that filesystem will be identical to the base name. If the base name does not conform, a conforming approximation is automatically generated. In the first of the two examples shown below, the specific name for Joliet and HFS+ are the same as the base name, whereas in the second example, none of the specific names are the same as the base name.

Example 1

Typical Name

Base name: "English Paper.doc"
Specific name for ISO-9660 level 1: "ENGLISHP.DOC"
Specific name for ISO-9660 level 2: "ENGLISH PAPER.DOC"
Specific name for Joliet: "English Paper.doc"
Specific name for HFS+: "English Paper.doc"

Example 2

Long Name with Illegal Characters

Base name: "This Name is Lengthy and/\Contains:$Unusual.Punctuation"
Specific name for ISO-9660 level 1: "THISNAME.PUN"
Specific name for ISO-9660 level 2: "THIS NAME IS LENGT.PUNCTUATION"
Specific name for Joliet: "This Name is Lengthy and—Contains$Unusual.Punctuation"
Specific name for HFS+: "This Name is Lengthy, and/\Contains/$Unusual.Punctuation"

The naming conventions for each filesystem standard are well known and therefore not specifically detailed here. The automatically-generated specific names can be queried through the API, and user-generated specific name overrides can be specified instead.

It is possible that more than one object will have the same specific name as another of its siblings (i.e., an object that has the same parent). Because filesystems do not generally allow siblings to have identical names, conflicts among the names must be resolved in the output. Non-conflicting conforming names for each individual filesystem are required. These non-conflicting conforming names are known as the "mangled" names for each filesystem. These are automatically generated from the specific name.

If there are no conflicts with siblings that have the same name, a filesystem object's mangled name will be identical to its specific name. If there are conflicts, the name is modified in some fashion to make it unique, for example by adding a numeric mangle code such as "_001". The automatically-generated mangled names can be queried through the API. Because the need for conflict resolution is absolute, mangled names cannot be explicitly set by the user; however, changing the specific names to avoid conflicts has the same effect.

Filesystem properties and metadata are another aspect where each of the intermingled output filesystems may be specified individually. Each filesystem object has a dictionary containing a key-value coded set of global properties for all filesystems, as well as override dictionaries containing overrides for particular filesystems (also key-value coded). When constructing each output filesystem's metadata, the decision on where to obtain each property goes from specific to general to default. First, the key in the override dictionary is consulted, and its value is used if present. If not present, then the key in the global dictionary is consulted, and its value is used if present. If neither is present, a reasonable default is assumed.

It is also possible to specify whether a particular filesystem object should be included at all in each intermingled output filesystem. Each filesystem object has a bitmask specifying in which filesystems it should be included. Where the mask contains a 1, the user of the API requests that a particular filesystem be generated, and where the mask contains a 0, the user of the API requests that the object be suppressed from inclusion in a particular filesystem. The bitmask assigned to the root object of the hierarchy determines which filesystems are to be generated in the final output.

There are two types of filesystem masks, "explicit" masks and "effective" masks. An object's explicit mask is the mask which has been explicitly set by the user of the API, and may be modified through the API. An object's effective mask corresponds to the mask that will actually be used when generating the output filesystems. The effective mask is computed automatically, as the bitwise AND of the object's explicit mask and the object's parent's effective mask. This is equivalent to the bitwise AND of the explicit masks of the object and its ancestors in the hierarchy (parent, grandparent, etc) up to the root. It will be appreciated that this logical relationship is necessary; if an object's parent folder is not included in a filesystem, the object itself cannot be included in the filesystem, and this behavior is achieved by the relationship above.

Figure 3:
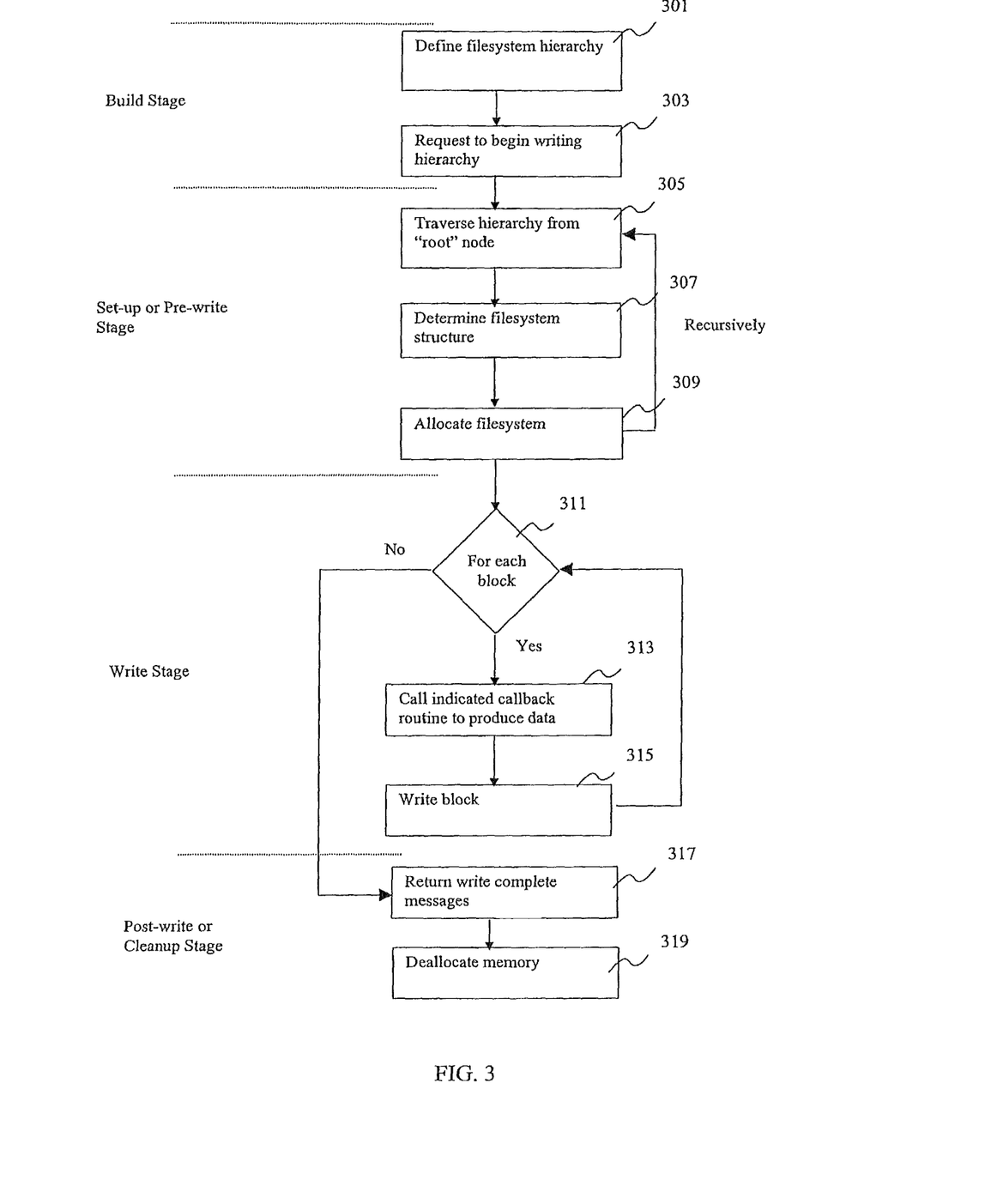
FIG. 3 shows a flow chart describing creation of a filesystem in accordance with an exemplary embodiment of the invention.

As shown in FIG. 3, the creation of a filesystem according to an embodiment of the invention begins, at step 301, with the specification of a desired filesystem hierarchy. The process of specifying or defining the hierarchy can be an interactive process, in that actions can be performed and queries can be made through the API. For example, a client of the API may issue queries about an object to find its specific/mangled name or other properties, and will be returned the values that will be used during the burn stage. Furthermore, during this stage, the client can change the properties of the object to indicate desired behavior as discussed above.

After the hierarchy has been defined or constructed, the client issues a request to begin recording, at step 303. This starts the process of actually recording the filesystem to the desired media, which may be divided into three stages: (1) the set-up or pre-write stage, (2) the write stage, and (3) the teardown or post-write stage as shown in FIG. 3.

During the set-up stage, steps 305-309, the hierarchy is prepared for writing. At this time, all steps necessary to determine each filesystem's structures are taken. This is achieved through a recursive traversal of the filesystem hierarchy beginning from the "root" node. During the traversal, the filesystem structure is defined at step 307. More specifically, virtual files that use a real-time callback to specify data have their sizes finalized, real folders are traversed to determine their descendants, and final mangled names and effective masks are determined for all objects that will be included in the final filesystem. The filesystem data structures are constructed and kept in the memory subsystem, unlike known methods which store a copy of the entire filesystem on disk.

Then at step 309, output blocks are allocated for file data as needed. For example, a 10 MB file will have a 10 MB chunk of blocks allocated to hold its data. Each chunk has several attributes specified upon allocation: size, placement criteria, and a callback to produce the data. The size is the size of the chunk, for example, 10 MB. The placement criteria specify requirements for placing the chunk, for example, "16 blocks from the start of the output", "256 blocks from the end of the output", "near the beginning", "near the end", or "anywhere". The latter criterion of "anywhere" is the default for most file data. The actual file data has not been accessed yet at this point, but every block that is to be written has an explicitly known data source indicated by a callback which is stored for later use.

Because it is impossible to accurately predict the dimensions of the final output before at least one initial traversal has completed, the location of the chunk in the output is not immediately returned. Later, once all needed chunks have been allocated, the block allocator performs a pass through all allocated chunks to assign final locations. During the last step before recording, these final locations are placed in the appropriate locations in the already-built filesystem structures.

After the setup has completed, the process of recording or writing the output to the desired media begins. As shown in step 313 of FIG. 3, the callback routine for each block is executed to retrieve the data associated with the block. Then at step 315, the chunk is written to disc, or other computer readable media as desired. This is repeated at step 311 until there are no chunks left. If there are any unallocated spaces between chunks, a pattern of all zeroes is written to fill the gap.

Not only does the use of the callback function prevent the inefficient and costly need to create an image of the filesystem, it allows file data to be retrieved from a variety of sources. For example, data can be retrieved from various locations on a hard drive, from a remote location via a network connection such as the Internet, or from a voice or video recorder. It may also be computed at real-time, for example during recording, decompressed from a compressed archive, or decrypted from an encrypted archive.

Finally, cleanup is performed after the write. At step 317, virtual file callbacks are sent a message notifying them that the writing is complete, and then any memory allocated by the pre-burn stage is deallocated at step 319.

Figure 4:
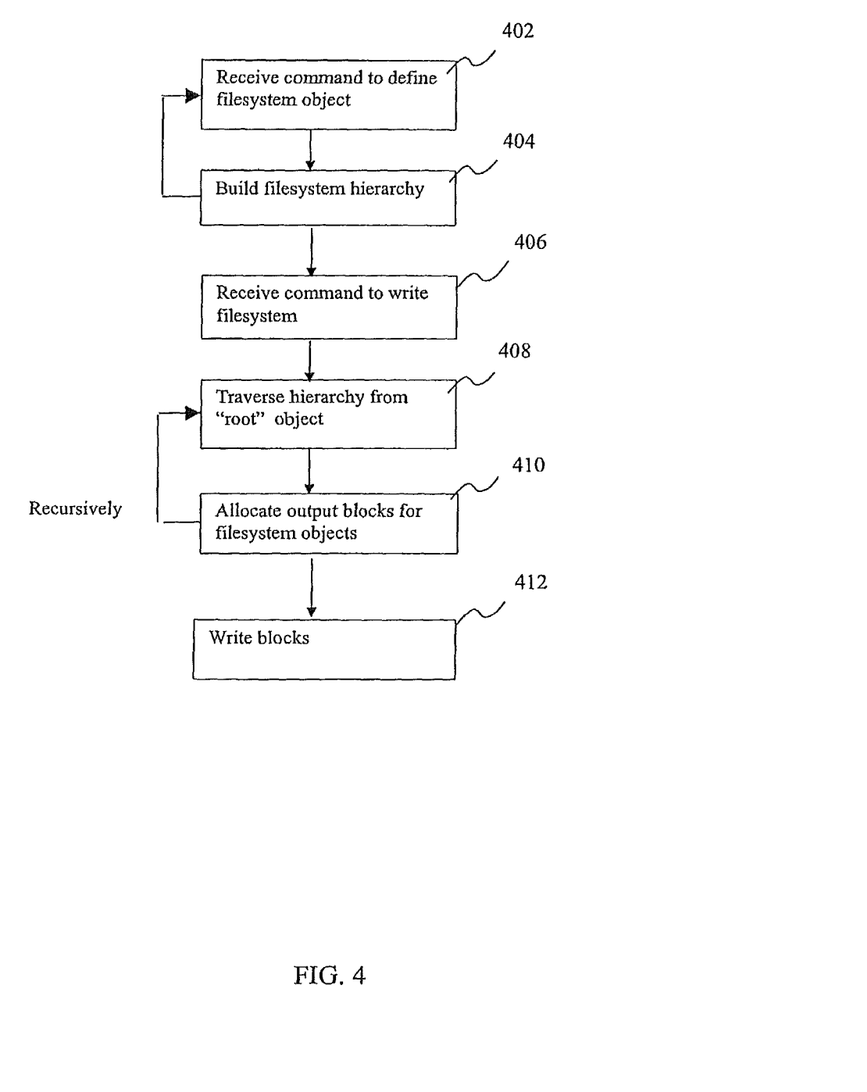
FIG. 4 shows a flow chart describing an application program interface in accordance with another embodiment of the invention.

As shown in steps 402 and 404 of FIG. 4, an application program interface in accordance with the invention receives commands to define filesystem objects and then defines the filesystem hierarchy utilizing these objects. This continues until the API receives a command to write the filesystem at step 406.

Upon receipt of the write command, the API is configured to recursively traverse the filesystem hierarchy beginning at the root object to allocate blocks to each filesystem object, steps 408 and 410. Then, at step 412, the blocks are written to the desired media.

It will be appreciated by those of ordinary skill in the art that the present invention can be embodied in other specific forms without departing from the spirit or central characteristics thereof. For example, while the invention has been described in the context of creating or burning CDs, the invention can also provide for the creation of DVDs, or any computer readable media. For example, the creation of filesystem on hard disks.

The presently disclosed embodiments are, therefore, considered in all respects to be illustrative and not restrictive. The scope of the invention is indicated by the appended claims, rather than the foregoing description, and all changes that come within the meaning and range of equivalents thereof are intended to be embraced therein.

We claim:

1. A method for creating filesystems on computer readable media in a computer, the method comprising the steps of:
    defining a filesystem structure for each filesystem, each filesystem structure including filesystem objects, and each filesystem object having at least one callback function that identifies a source of data for each filesystem object;
    storing each filesystem structure in memory of the computer without storing the data from the identified sources as part of the stored filesystem structures in an image of each filesystem, wherein the data for each filesystem object is stored at the identified source; and
    writing each filesystem onto the computer readable media from the filesystem structures by retrieving the data for the object from the source identified by the callback function through a decompression or decryption operation.

2. The method of claim 1, wherein the step of writing the filesystem further comprises:
    reading the callback function for each object from the filesystem structures stored in memory.

3. The method of claim 1, wherein the step of writing the filesystem comprises the step of:
    recursively traversing each filesystem structure beginning with a root object; and
    allocating output blocks for each object within a respective filesystem structure.

4. The method of claim 1, wherein the identified source is a real-time application.

5. The method of claim 1, wherein storing the filesystem structure in memory comprises:
    storing less than a complete image of each filesystem structure.

6. The method of claim 1, wherein defining the filesystem structure comprises:
    specifying a filesystem hierarchy of filesystem objects and folders.

7. The method of claim 1, wherein the filesystem hierarchy includes at least one of real files, virtual files, real folders, and virtual folders.

8. A computer readable media that stores an application program interface (API) for dynamically creating filesystems on computer readable media in a computer, wherein when executed the API causes the computer to execute the method comprising:
    defining a filesystem structure for each filesystem, each filesystem structure comprising plural filesystem objects, each filesystem object having at least one callback function that identifies a source of data for a respective object;
    storing the filesystem structure in memory of the computer without storing the data from the identified sources as part of the stored filesystem structures in an image of each filesystem, wherein the data for each filesystem object is stored at the identified source;
    retrieving the data for each filesystem object from the source indicated by the callback function through a decompression or decryption operation; and
    writing each filesystem onto the computer readable media based on the retrieved data of a respective filesystem object.

9. The computer readable media of claim 8, where when executed the API causes the computer to execute the steps of:
    reading the callback function for the at least one object from each filesystem structure stored in memory.

10. The computer readable media of claim 8, wherein the step of retrieving the data further comprises:
    computing the data from the source in real-time.

11. The computer readable media of claim 8, where when executed the API causes the computer to execute the steps of:
    recursively traversing each filesystem hierarchy beginning with a root object; and
    allocating output blocks for each filesystem object within a respective filesystem hierarchy.

12. The method of claim 8, wherein storing the filesystem structure in memory comprises:
    storing less than a complete image of each filesystem structure.

13. The method of claim 8, wherein defining the filesystem structure comprises:
    specifying a filesystem hierarchy of file objects and folders.

14. A computer system for creating filesystems wherein the computer system, includes a processor that executes an operating system, the operating system including at least one API, said API being configured to perform the steps of:
    building a filesystem structure for each filesystem, wherein each filesystem structure includes plural filesystem objects, each filesystem object having at least one respective callback function that identifies a source of data;
    storing each filesystem structure in memory without storing the data from the identified sources as part of the stored filesystem structures in an image of each filesystem, wherein the data for each filesystem object is stored at the identified source; and
    retrieving the data for each filesystem object from the source identified by the respective callback function in real-time.

15. The system of claim 14, wherein the API executes the steps of:
    reading the respective callback function for each filesystem object of each filesystem structure stored in said memory.

16. The system of claim 14, wherein the API executes the steps of:
    recursively traversing each filesystem structure beginning with a root object; and
    allocating output blocks for each filesystem object within a respective filesystem structure.

17. The system of claim 14, wherein executing the steps of retrieving the data comprises:
    decompressing the data from a compressed archive at the identified source in real-time.

18. The system of claim 14, wherein executing the steps of retrieving the data comprises:
   decrypting the data from an encrypted archive at the identified source in real-time.

19. The system of claim 14, wherein executing the step of retrieving the data comprises:
   computing the data from the source in real-time.

20. The system of claim 14, wherein storing the filesystem structure in memory comprises:
   storing less than a complete image of each filesystem structure.

* * * * *